United States Patent
Hamada et al.

(10) Patent No.: US 11,113,519 B2
(45) Date of Patent: Sep. 7, 2021

(54) CHARACTER RECOGNITION APPARATUS, CHARACTER RECOGNITION PROGRAM, AND CHARACTER RECOGNITION METHOD

(71) Applicant: FUJITSU LIMITED, Kawasaki (JP)

(72) Inventors: Yusuke Hamada, Ota (JP); Misato Hishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 16/502,085

(22) Filed: Jul. 3, 2019

(65) Prior Publication Data
US 2020/0034612 A1 Jan. 30, 2020

(30) Foreign Application Priority Data
Jul. 27, 2018 (JP) .............................. JP2018-140824

(51) Int. Cl.
| | | |
|---|---|---|
| G06K 9/00 | (2006.01) | |
| G06K 9/32 | (2006.01) | |
| G06K 9/34 | (2006.01) | |
| G06K 9/62 | (2006.01) | |

(52) U.S. Cl.
CPC ....... G06K 9/00463 (2013.01); G06K 9/3233 (2013.01); G06K 9/344 (2013.01); G06K 9/6263 (2013.01); G06K 2209/01 (2013.01)

(58) Field of Classification Search
CPC .. G06K 9/325; G06K 9/00463; G06K 9/6273; G06K 9/3233; G06K 9/344; G06K 9/72; G06K 9/6263; G06K 2209/01
See application file for complete search history.

(56) References Cited

U.S. PATENT DOCUMENTS

| | | | | |
|---|---|---|---|---|
| 2002/0159637 A1* | 10/2002 | Echigo | ...................... | G06T 7/20 382/190 |
| 2009/0144614 A1* | 6/2009 | Dresevic | ............... | G06F 40/137 715/239 |
| 2013/0070964 A1* | 3/2013 | Nagamine | ................ | G06K 9/72 382/103 |
| 2013/0330005 A1* | 12/2013 | Lu | ............................ | G06K 9/72 382/182 |
| 2015/0319510 A1* | 11/2015 | Ould Dellahy, VIII | ..................... | H04N 21/4725 725/32 |
| 2016/0027177 A1* | 1/2016 | Hutchison | ............ | G06K 9/6202 382/103 |
| 2016/0300116 A1* | 10/2016 | Yasunaga | ................. | G06K 9/18 |

FOREIGN PATENT DOCUMENTS

| | | |
|---|---|---|
| JP | 6-215293 | 8/1994 |
| JP | 2007-58480 | 3/2007 |
| WO | 2008/050718 | 5/2008 |

* cited by examiner

*Primary Examiner* — Yubin Hung
(74) *Attorney, Agent, or Firm* — Fujitsu Patent Center (57) ABSTRACT

A character recognition method for a moving image includes extracting a region corresponding to a character string included in each frame of a moving image to be recognized. The method reads a character string from the extracted region and corrects the character string read from each frame, based on appearance rule information that specifies an appearance rule of a character string corresponding to the order of the frames, such that the appearance order of the read character string conforms to the appearance rule.

9 Claims, 12 Drawing Sheets

| FORMAT | REGION DIVISION | TEACHING DATA | CLASSIFICATION LABEL |
|---|---|---|---|
| YYYY/MM/DD | YYYY/MM/DD | 4-DIGIT NUMBER IMAGE | CLASSIFY INTO 10000 LABELS OF 0000 TO 9999 |
| | | 2-DIGIT NUMBER IMAGE | CLASSIFY INTO 100 LABELS OF 00 TO 99 |
| HH:mm:SS:FF | HH:mm:SS:FF | 2-DIGIT NUMBER IMAGE | CLASSIFY INTO 100 LABELS OF 00 TO 99 |

CHARACTER RECOGNITION APPARATUS, CHARACTER RECOGNITION PROGRAM, AND CHARACTER RECOGNITION METHOD

CROSS-REFERENCE TO RELATED APPLICATION

This application is based upon and claims the benefit of priority of the prior Japanese Patent Application No. 2018-140824, filed on Jul. 27, 2018, the entire contents of which are incorporated herein by reference.

FIELD

The embodiment discussed herein is related to a character recognition apparatus, a character recognition program, and a character recognition method.

BACKGROUND

There has heretofore been known a character recognition technology to recognize numerical values, characters, and the like included in an image. As for the character recognition technology, there is a technology to perform character recognition for each of a Land Transport Office code, a vehicle type code, and a use code by cutting a license plate region out of an input image to extract a serial number and then determining coordinates of each code by using coordinates of each of the numbers. There is also a technology to perform optical character recognition (OCR) processing on a numerical value located at a position recognized from display data and discard the data as an error when there is a discrepancy between OCR processing results included in each pair of consecutive first and second display data. There is also a technology to perform telop (television opaque projector, or ticker) recognition by detecting a roll telop from content.

Related techniques are disclosed in, for example, Japanese Laid-open Patent Publication Nos. 6-215293 and 2007-58480 and International Publication Pamphlet No. WO 2008/50718.

However, in the above conventional technology, the numerical values are recognized frame by frame, for example, and the data is discarded as an error when there is a discrepancy in OCR processing result between frames. Therefore, there is a problem that it is difficult to accurately recognize characters sequenced in chronological order such as time, time code, or the like displayed in a video.

SUMMARY

According to an aspect of the embodiments, a character recognition method for a moving image is performed by a computer. The method includes: extracting a region corresponding to a character string included in each frame of a moving image to be recognized, for each frame; reading a character string from the extracted region; and correcting the character string read from each frame, based on appearance rule information that specifies an appearance rule of a character string corresponding to the order of the frames, such that the appearance order of the read character string conforms to the appearance rule.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, with reference to the drawings, description is given of a character recognition apparatus, a character recognition program, and a character recognition method according to an embodiment. In this embodiment, constituent components having the same functions are denoted by the same reference numerals, and repetitive description thereof is omitted. Note that the character recognition apparatus, the character recognition program, and the character recognition method described in the following embodiment are merely an example and not intended to limit the embodiment. The respective embodiments may be combined as appropriate without causing any inconsistency.

Figure 1:
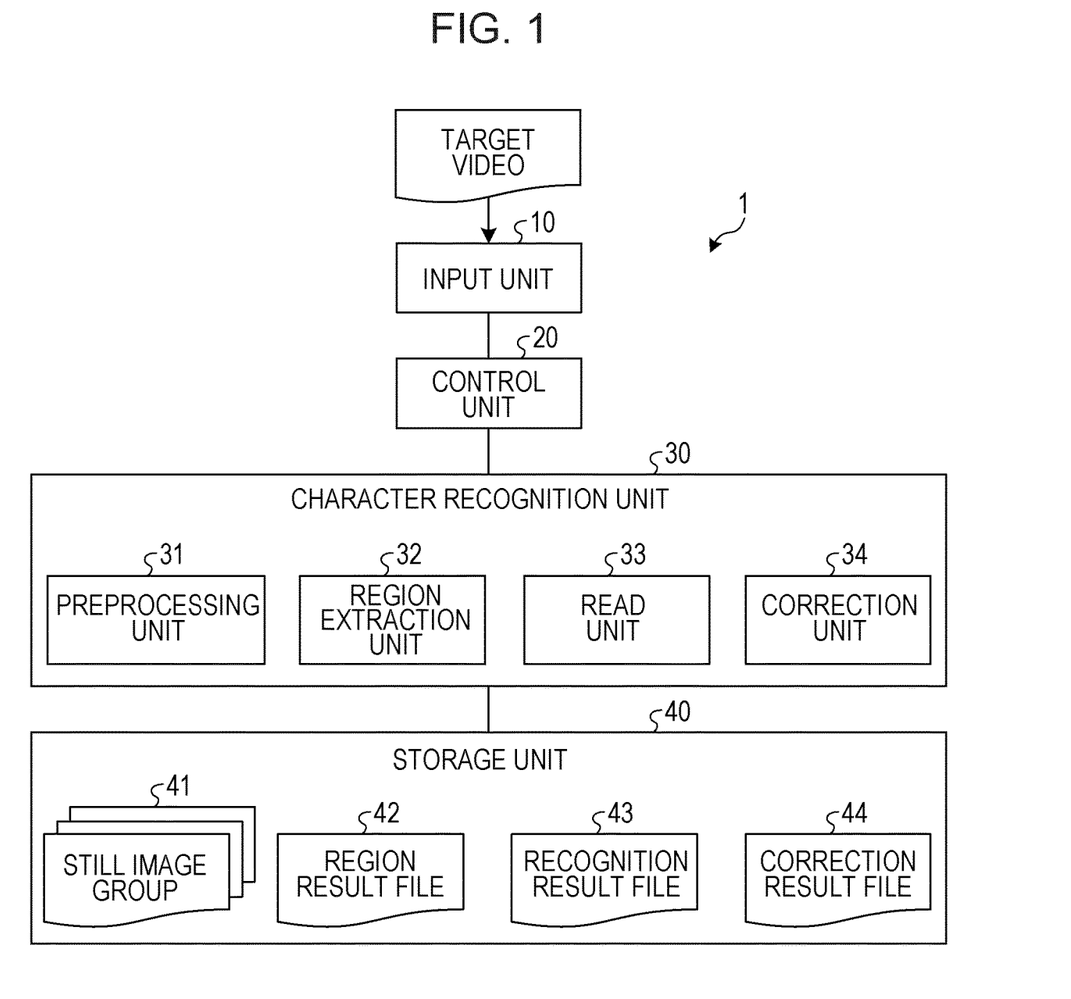
FIG. 1 is a block diagram illustrating a functional configuration example of a character recognition apparatus according to an embodiment.

FIG. 1 is a block diagram illustrating a functional configuration example of the character recognition apparatus according to the embodiment. As illustrated in FIG. 1, a character recognition apparatus 1 is an information processor that receives input of a target video for character recognition and recognizes a character string displayed in a moving image.

For example, the character recognition apparatus 1 is a personal computer (PC) or the like, which receives input of the target video through a local area network (LAN) or a communication network (not illustrated) such as the Internet. The character recognition apparatus 1 outputs the character string recognized from the inputted target video to a file, a display, or the like.

Broadcast content and the like, for example, may be applied as the target video. Examples of the character strings to be recognized from the target video include time codes corresponding to times such as a shooting time, captions such as lines, telops such as description of videos, credit titles, and the like. In this embodiment, description is given of an example of recognizing a time code corresponding to a shooting time (or shooting duration) described in a predetermined format. However, the character string to be recognized is not particularly limited but may be a caption or a telop.

The character recognition apparatus 1 includes an input unit 10, a control unit 20, a character recognition unit 30, and a storage unit 40.

The input unit 10 is a processing unit that receives input of a target video (moving image data) through a communication interface or the like. The input unit 10 outputs the inputted target video to the control unit 20.

The control unit 20 is a processing unit that controls processing performed by the input unit 10 and the character recognition unit 30. For example, once the target video is inputted by the input unit 10, the control unit 20 outputs the inputted target video to the character recognition unit 30, and the character recognition unit 30 performs processing to recognize a character string in the target video.

The character recognition unit 30 is a processing unit that performs the character string recognition processing based on the target video outputted from the control unit 20 and stores a recognition result (recognition result file 43 and correction result file 44) in the storage unit 40. The control unit 20 retrieves the recognition result stored in the storage unit 40 and outputs the recognition result to a display or the like, for example.

For example, the character recognition unit 30 includes a preprocessing unit 31, a region extraction unit 32, a read unit 33, and a correction unit 34.

The preprocessing unit 31 is a processing unit that performs preprocessing on a target image. For example, the preprocessing unit 31 divides the target image into frames to generate a still image group 41. The still image group 41 generated by the preprocessing unit 31 is stored in the storage unit 40. For example, the still image group 41 is a still image file with numbers or the like attached in the order of frame, in which one frame in a target video corresponds to one image.

The region extraction unit 32 is a processing unit that extracts a region corresponding to a character string included in each frame in the target video, by referring to the still image group 41 stored in the storage unit 40. The region extraction unit 32 stores information indicating the region extracted in each frame (such as coordinates of the region), together with the frame number indicating the frame, and the like, as a region result file 42 in the storage unit 40.

The read unit 33 is a processing unit that reads the character string from the region corresponding to the character string, which is extracted in each frame, by referring to the still image group 41 and the region result file 42. For example, the read unit 33 refers to the information on the region indicated together with the frame number in the region result file 42 to specify a region corresponding to the character string from a still image (frame) with the corresponding frame number in the still image group 41. The read unit 33 performs character recognition processing on the specified region. The read unit 33 stores the read character string, together with the frame number, as the recognition result file 43 in the storage unit 40.

The correction unit 34 is a processing unit that corrects the character string read from each frame, based on information regarding an appearance rule of a character string corresponding to the order of frames, such that the appearance order of the character string read by the read unit 33 conforms to the frame-order appearance rule specified in the appearance rule information.

As for a character string such as a time code in a target video, for example, an appearance order thereof has a predetermined regularity corresponding to the order of frames. As an example, a numerical value such as a time code counts up or down according to the order of frames. Likewise, hiragana characters displayed in the Japanese alphabet order or alphabetical characters displayed in the English alphabet order, as well as credit titles rolling upward, and the like may also be said to be character strings with predetermined appearance rules according to the order of frames.

The correction unit 34 estimates appearance rule information on character strings by arranging the character strings read by the read unit 33 in the order of frames based on the recognition result file 43, so as to conform to the appearance rule corresponding to the order of frames. The correction unit 34 corrects the character string erroneously recognized so as to comply with the estimated appearance rule information, and stores the correction result as a correction result file 44 in the storage unit 40.

As for the numerical values such as the time codes, for example, the appearance rule information may be estimated as numerical values counting up such as "01", "02", "03", "04" . . . by arranging the character strings recognized in the order of frames. Based on this appearance rule information, the correction unit 34 corrects the erroneously recognized character strings such that the appearance order corresponding to the order of frames of the character strings recognized in the recognition result file 43 complies with the appearance rules specified in the appearance rule information. When the recognized character string is in the order of "01", "02", "08", "04" . . . , for example, it is estimated that "03" is erroneously recognized as "08", and thus "08" is corrected to "03".

The storage unit 40 is, for example, a storage device such as a hard disk drive (HDD) to store the still image group 41, the region result file 42, the recognition result file 43, and the correction result file 44.

The extraction of a region, reading of a character string, and correction of the read character string, which are performed by the region extraction unit 32, the read unit 33, and the correction unit 34, respectively, are performed using a learning model learned by machine learning such as deep learning.

Figure 2:
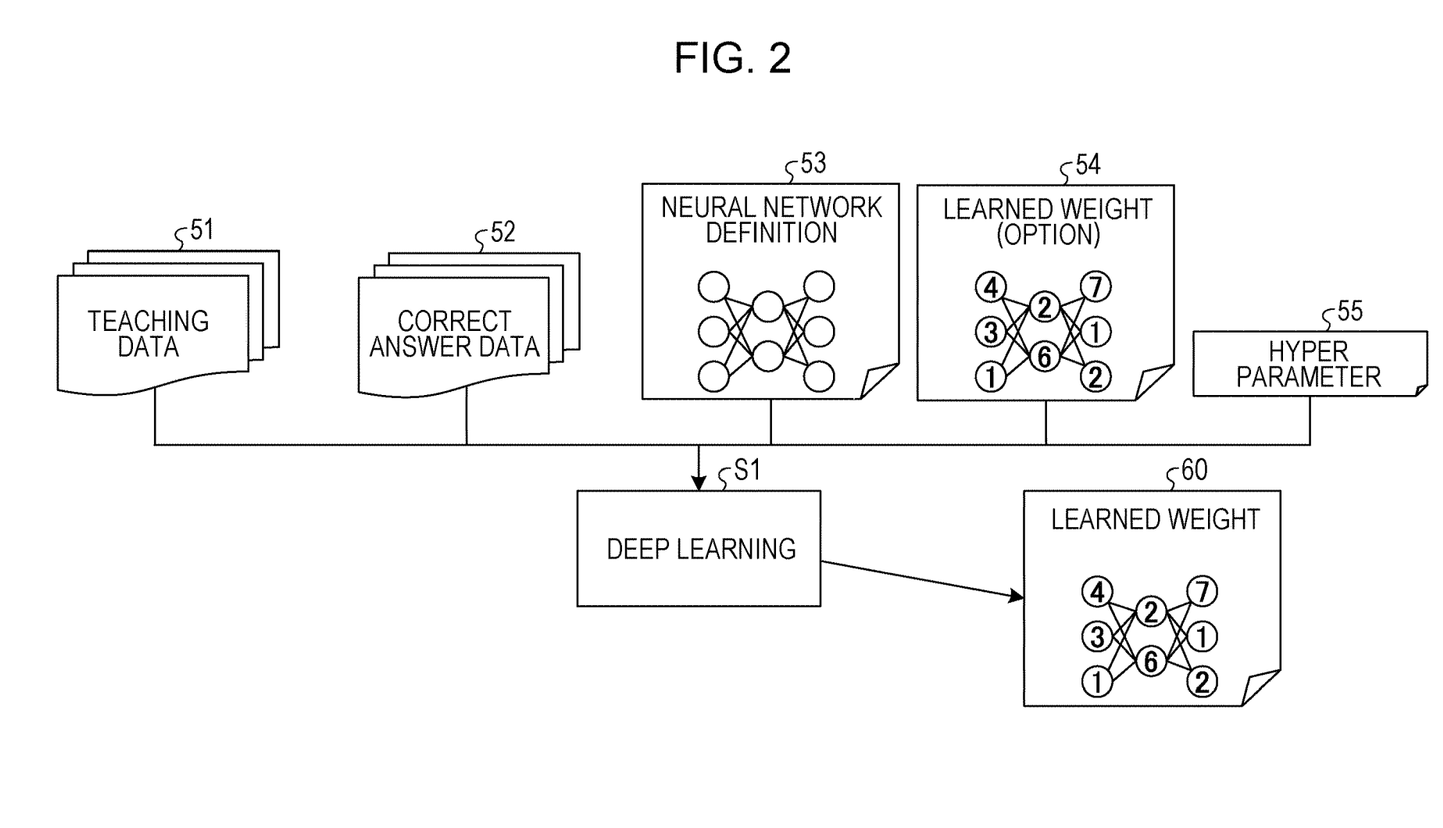
FIG. 2 is an explanatory diagram explaining an example of a learning phase.

FIG. 2 is an explanatory diagram explaining an example of a learning phase. As illustrated in FIG. 2, in deep learning (S1), an initial neural network is built using a neural network definition 53, a learned weight (option) 54, and a hyper parameter 55. In the deep learning, teaching data 51 and correct answer data 52 are applied to the built neural network to perform learning of the neural network so as to execute the extraction of a region, reading of a character string, and correction of the read character string.

For example, in the deep learning (S1), a difference (loss) between the correct answer data 52 and an inference result is obtained by forward propagating the teaching data 51 to the neural network. An optimum solution is approximated by back-propagating the obtained difference to the neural network to change a parameter of each node in the neural network. Through such deep learning (S1), the parameter of each node in the neural network is obtained as a learned weight 60.

Figure 3:
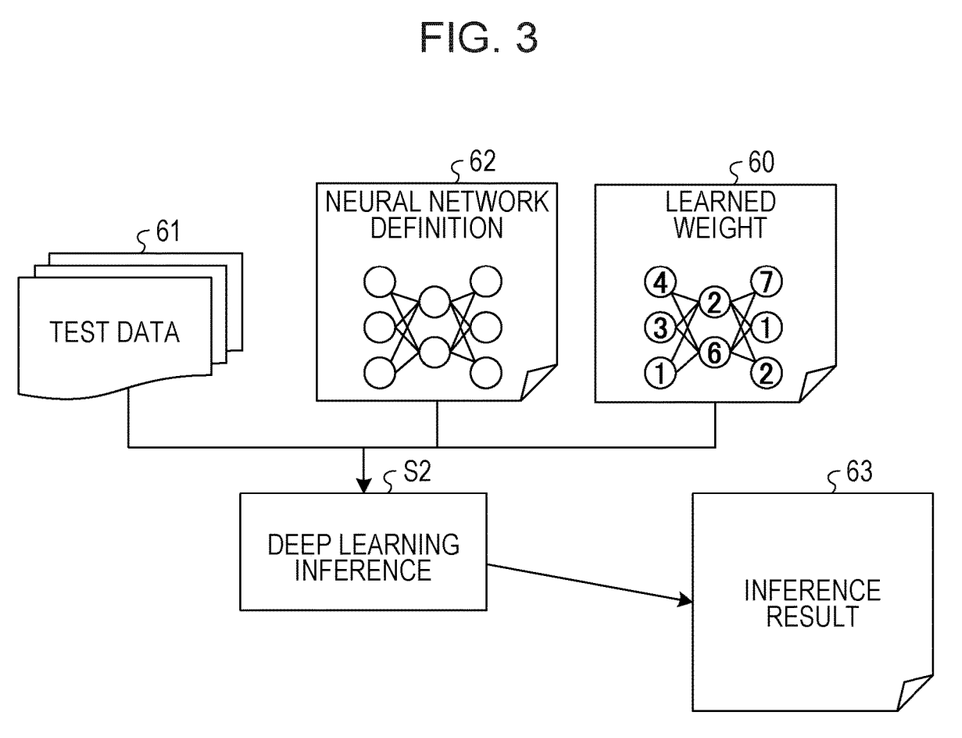
FIG. 3 is an explanatory diagram explaining an example of an inference phase.

FIG. 3 is an explanatory diagram explaining an example of an inference phase. As illustrated in FIG. 3, in the inference phase (S2), a neural network 62 is built based on the learned weight 60 obtained in the learning phase and test data 61. In the inference phase (S2), the test data 61 to be subjected to extraction of a region, reading of a character string, correction of the read character string, and the like is applied to the neural network. Thus, an inference result 63 of the extraction of a region, reading of a character string, correction of the read character string, and the like may be obtained.

Figure 4:
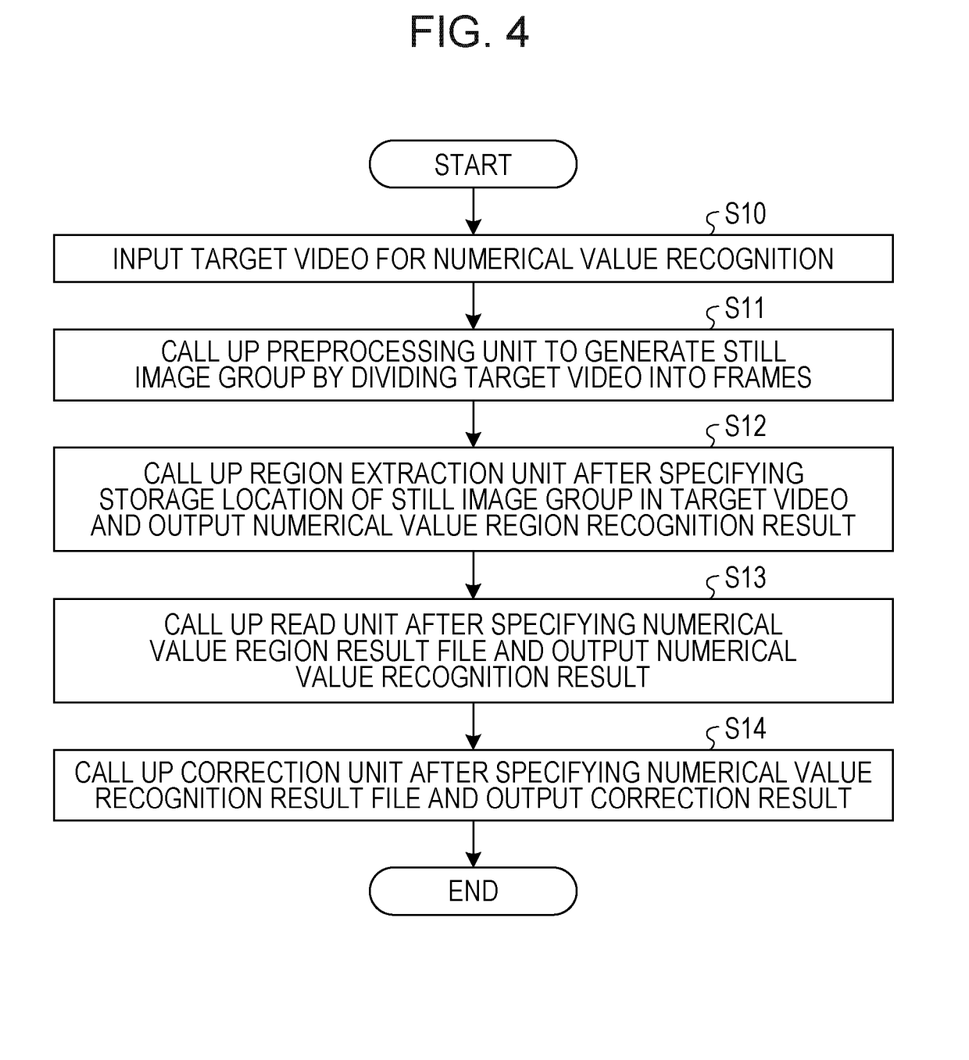
FIG. 4 is a flowchart illustrating an operation example of the character recognition apparatus according to the embodiment.

FIG. 4 is a flowchart illustrating an operation example of the character recognition apparatus 1 according to the embodiment. As illustrated in FIG. 4, with reference to FIG. 1, once processing is started, the input unit 10 receives input of a target video to be recognized (S10). The control unit 20 outputs the received target video to the character recognition unit 30.

The character recognition unit 30 calls up the preprocessing unit 31 to generate a still image group 41 by dividing the target video into frames (S11). The preprocessing unit 31 stores the generated still image group 41 in the storage unit 40.

The character recognition unit 30 specifies a storage location of the still image group 41 of the target video, and calls up the region extraction unit 32. The region extraction unit 32 performs processing of outputting a region result file 42 by referring to the specified still image group 41 and extracting a region corresponding to a character string included in the frame for each frame of the target video (S12).

Figure 5:
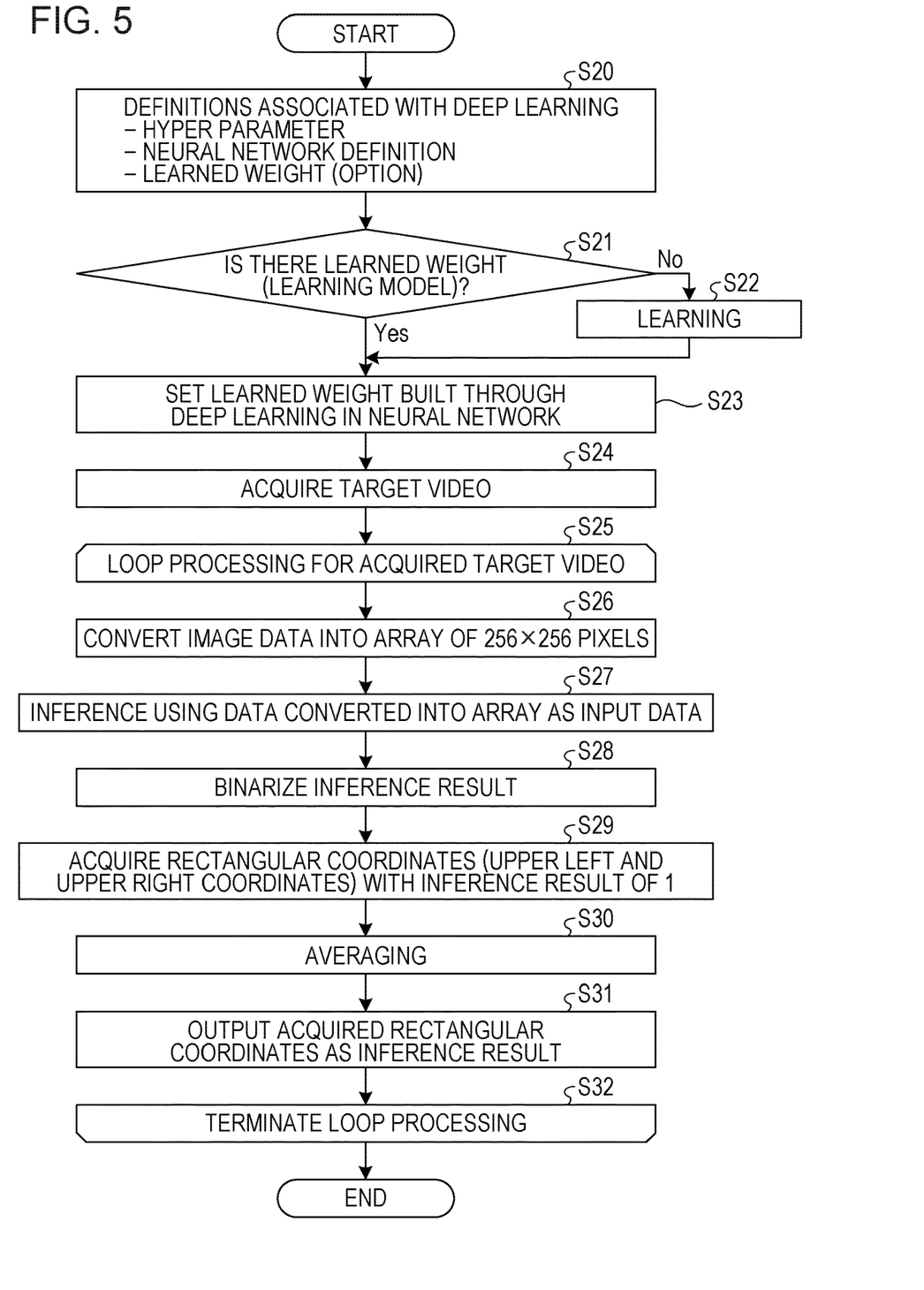
FIG. 5 is a flowchart illustrating a processing example associated with region extraction.

FIG. 5 is a flowchart illustrating a processing example associated with region extraction. As illustrated in FIG. 5, and with reference to FIG. 1, once processing is started, the region extraction unit 32 sets definitions associated with deep learning (hyper parameter 55, neural network definition 53, and learned weight (option) 54) (S20). the region extraction unit 32 determines whether or not there is learned weight 60 (learning model) (S21). When learning is yet to be performed and there is no learned weight 60 (S21: NO), the region extraction unit 32 performs learning in the learning phase (S1) described above (S22). When the learning has been performed and there is the learned weight 60 (S21: YES), the region extraction unit 32 advances to S23.

Figure 6:
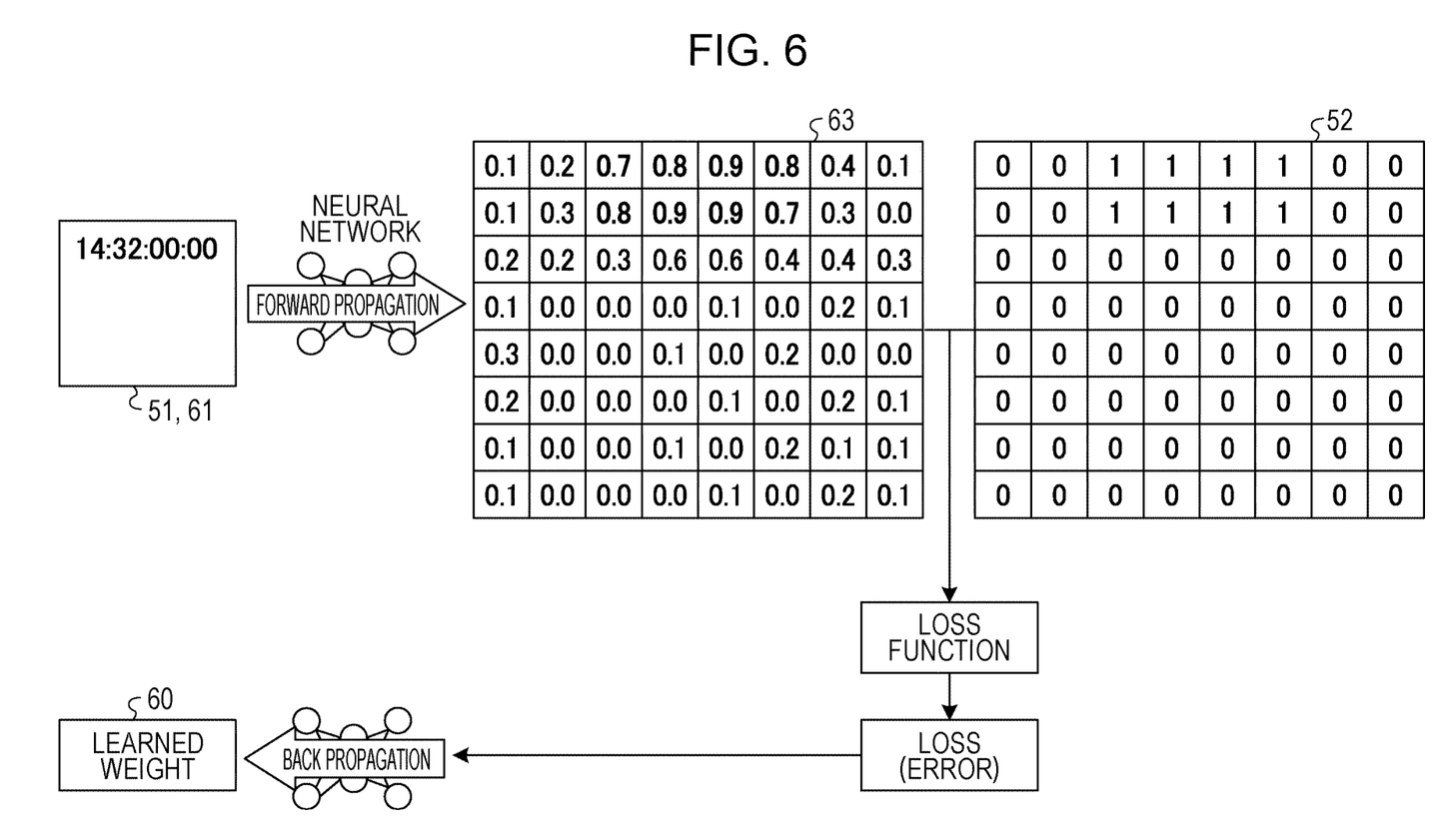
FIG. 6 is an explanatory diagram explaining learning and inference associated with the region extraction.

FIG. 6 is an explanatory diagram explaining learning and inference associated with the region extraction. As illustrated in FIG. 6, in the learning associated with the region extraction, teaching data 51 that is a moving image indicating a character string to be extracted, such as a time code, and correct answer data 52 indicating a region associated with the character string to be extracted (in the example illustrated in FIG. 6, a pixel position is set to "1") are prepared.

A loss function is used to obtain a loss (error) between the correct answer data 52 and an inference result obtained by forward propagating the teaching data 51 to the neural network. A learned weight 60 for extracting a region is obtained by back-propagating the obtained loss to the neural network and thus changing a parameter of each node in the neural network to approximate an optimum solution.

Referring back to FIG. 5, after S21 and S22, the region extraction unit 32 sets the learned weight 60 obtained by deep learning in the neural network (S23) to obtain a target video (still image group 41) (S24).

For the obtained target video, the region extraction unit 32 performs loop processing (S25 to S32) for each frame of the divided still image group 41.

Once the loop processing is started, the region extraction unit 32 converts image data (frame) to be processed into an array of 256×256 pixels, for example, to be inputted to an input layer of the neural network (S26).

The region extraction unit 32 uses the data converted into the array as input data (test data 61) of the neural network set in S23 to perform inference associated with region extraction (S27).

For example, as illustrated in FIG. 6, the region extraction unit 32 obtains an inference result 63 of inference of a region corresponding to a character string by forward propagating the input data (test data 61) converted into the array to the neural network. Note that numerical values in the inference result 63 are values indicating a probability of the region corresponding to the character string. For example, in the inference result 63, a region having a value not less than a predetermined threshold (for example, 0.7) is the region corresponding to the character string.

Referring again to FIG. 5, the region extraction unit 32 binarizes the inference result 63 with the predetermined threshold (S28) to obtain a rectangular region (upper left and lower right coordinates) having the inference result of 1 (S29).

The region extraction unit 32 averages the obtained rectangular region between the nearest frames (S30). For example, the region extraction unit 32 averages position coordinates of the rectangular region by obtaining a moving average of the rectangular regions obtained by the current loop processing and the previous loop processing, that is, an average of the rectangular regions obtained from the nearest predetermined number of frames.

The region extraction unit 32 outputs the coordinates of the rectangular region thus obtained as an inference result of the region corresponding to the character string (S31). The region extraction unit 32 extracts the region corresponding to the character string for each frame by performing such loop processing for the still image group 41.

Referring back to FIG. 4, after S12, the character recognition unit 30 calls up the read unit 33 after specifying the region result file 42. The read unit 33 performs processing of outputting the recognition result file 43 by referring to the specified region result file 42 and reading a character string from the region extracted by the region extraction unit 32 (S13).

Figure 7:
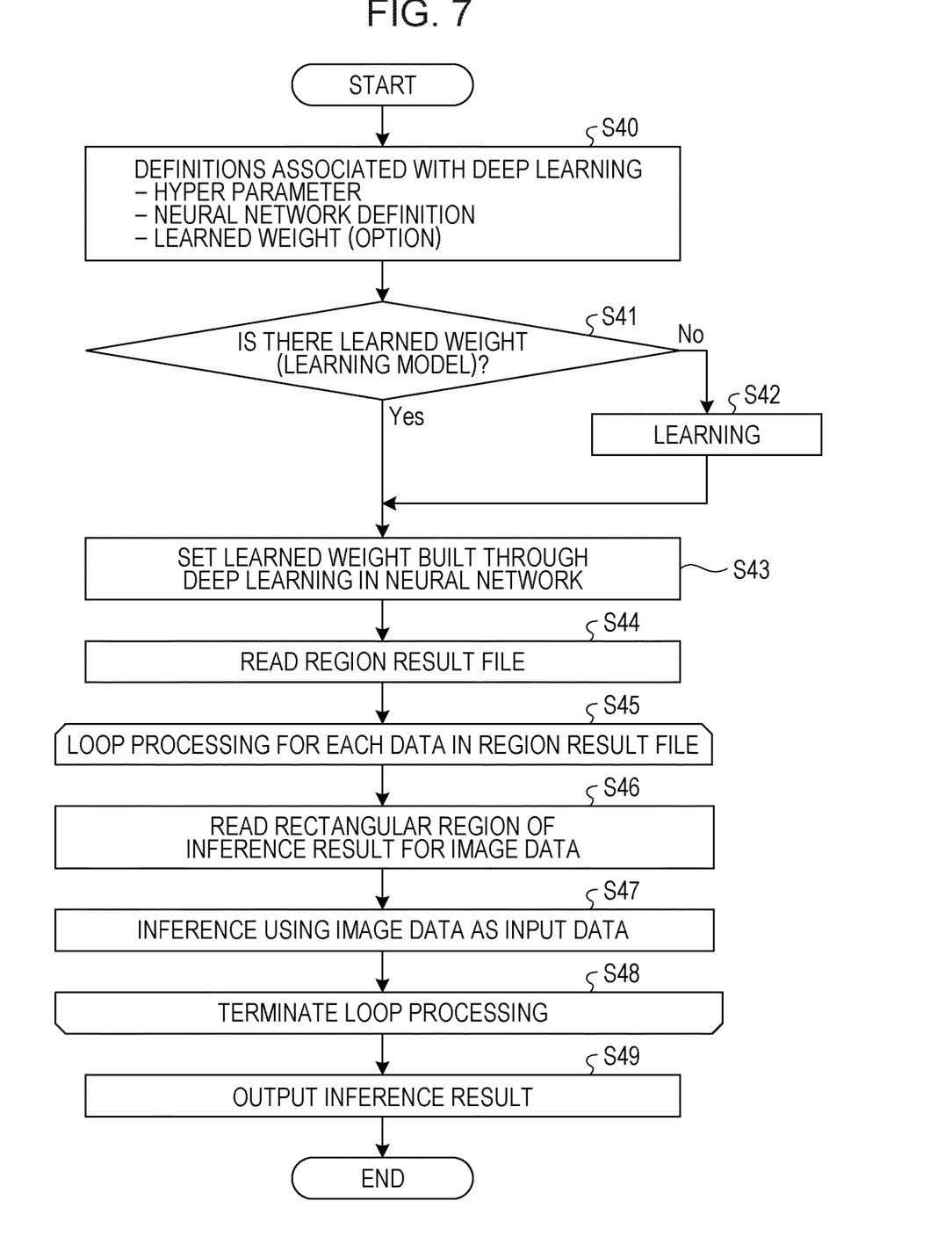
FIG. 7 is a flowchart illustrating a processing example associated with reading.

FIG. 7 is a flowchart illustrating a processing example associated with reading. As illustrated in FIG. 7, and with reference to FIG. 2, once processing is started, the read unit 33 sets definitions associated with deep learning (hyper parameter 55, neural network definition 53, and learned weight (option) 54) (S40). The read unit 33 determines whether or not there is learned weight 60 (learning model) (S41). When learning is yet to be performed and there is no learned weight 60 (S41: NO), the read unit 33 performs learning in the learning phase (S1) described above (S42). When the learning has been performed and there is the learned weight 60 (S41: YES), the read unit 33 advances to S43.

Figure 8:
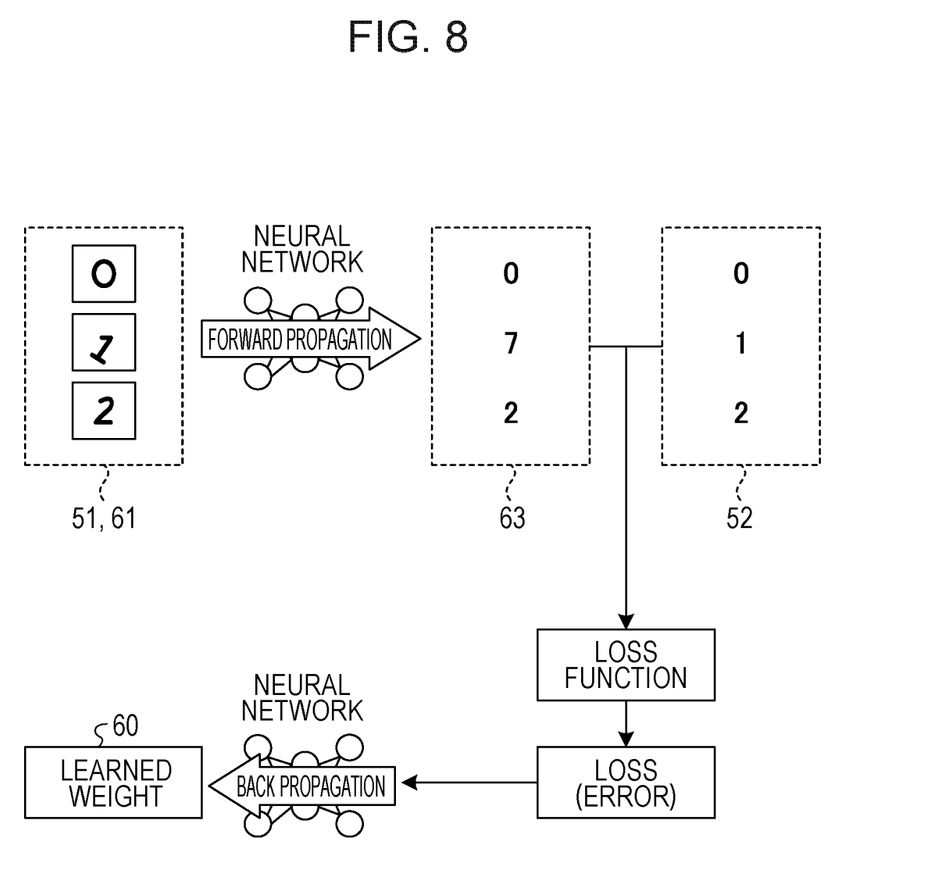
FIG. 8 is an explanatory diagram explaining learning and inference associated with the reading.

FIG. 8 is an explanatory diagram explaining learning and inference associated with the reading. As illustrated in FIG. 8, in the learning associated with the reading, teaching data 51 that is an image of a character to be read, such as a time code, and correct answer data 52 indicating a character of an answer are prepared. The teaching data 51 may be augmented to increase a variation of images of the character.

A loss function is used to obtain a loss (error) between the correct answer data 52 and an inference result is obtained by forward propagating the teaching data 51 to the neural network. A learned weight 60 for reading a character is obtained by back-propagating the obtained loss to the neural network and thus changing a parameter of each node in the neural network to approximate an optimum solution.

The teaching data 51 may be one adapted to a format (display format) of a character string to be read. Thus, a character string of a predetermined display format may be learned as a character string to be read.

Figure 9:
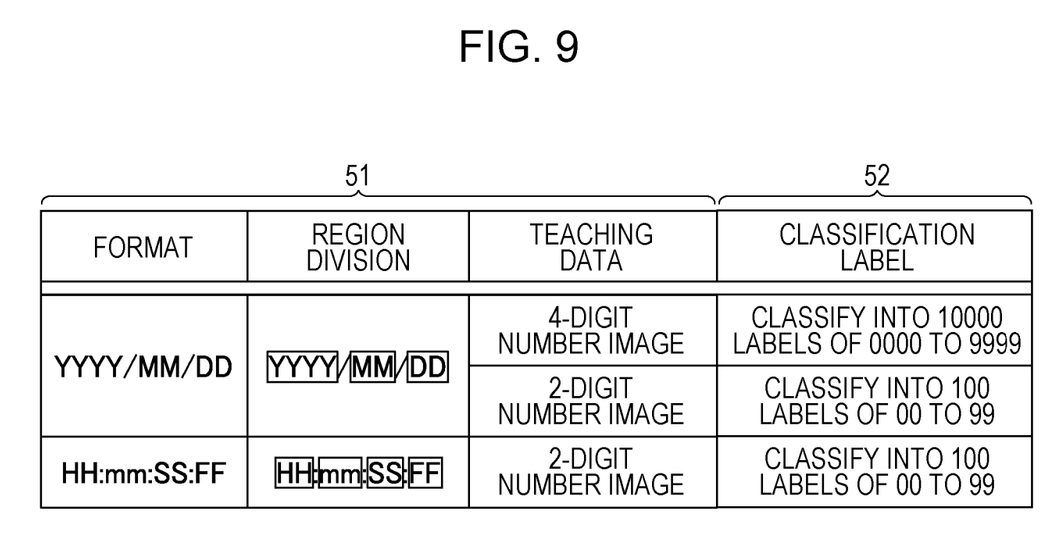
FIG. 9 is an explanatory diagram explaining learning adapted to a format.

FIG. 9 is an explanatory diagram explaining learning adapted to a format. As illustrated in FIG. 9, teaching data 51 and correct answer data 52 are prepared according to a format (display format) of a character string to be read from a target video.

As for a year-month-day format such as "YYYY/MM/DD", for example, teaching data 51 of images of 4-digit and 2-digit numbers are prepared to read character strings from "YYYY", "MM", and "DD", respectively. As for the teaching data 51 of 4-digit images, classification labels (correct answer data 52) are prepared to classify into 10000 labels of "0000" to "9999". Likewise, as for the teaching data 51 of 2-digit images, classification labels (correct answer data 52) are prepared to classify into 100 labels of "00" to "99". Thus, learning corresponding to the "YYYY/MM/DD" format may be performed, and a learning model capable of accurately inferring the character string of "YYYY/MM/DD" may be generated. The same goes for a "HH:mm:SS:FF" (hour-minute-second-fraction) format of a time code.

Referring back to FIG. 7, after S41 and S42, the read unit 33 sets in the neural network the learned weight 60 built through the deep learning (S43) to read the region result file 42 (S44). The read unit 33 performs loop processing (S45 to S48) by sequentially reading the respective data (information of frame number and region) from the region result file 42.

Once the loop processing is started, the read unit 33 reads the rectangular region of the inference result from the region extraction unit 32 by referring to the region information for the image data of the still image group 41 corresponding to the frame number (S46).

The read unit 33 performs inference associated with reading of a character string by using the image data of the rectangular region as input data (test data 61) of the neural network (S47).

For example, as illustrated in FIG. 8, the read unit 33 obtains an inference result 63 of inference of a character string by forward propagating the image data (test data 61) of the rectangular region to the neural network.

After the above loop processing (S45 to S48), the read unit 33 outputs the inference result 63 of the inference of the character string as the recognition result file 43 (S49) and then terminates the processing.

Referring back to FIG. 4, after S13, the character recognition unit 30 calls up the correction unit 34 after specifying the recognition result file 43. The correction unit 34 performs processing of outputting a correction result file 44 by referring to the specified recognition result file 43 and correcting the character string read from each frame such that the appearance order of the character strings read by the read unit 33 conforms to the frame-order appearance rule specified in the appearance rule information (S14).

Figure 10:
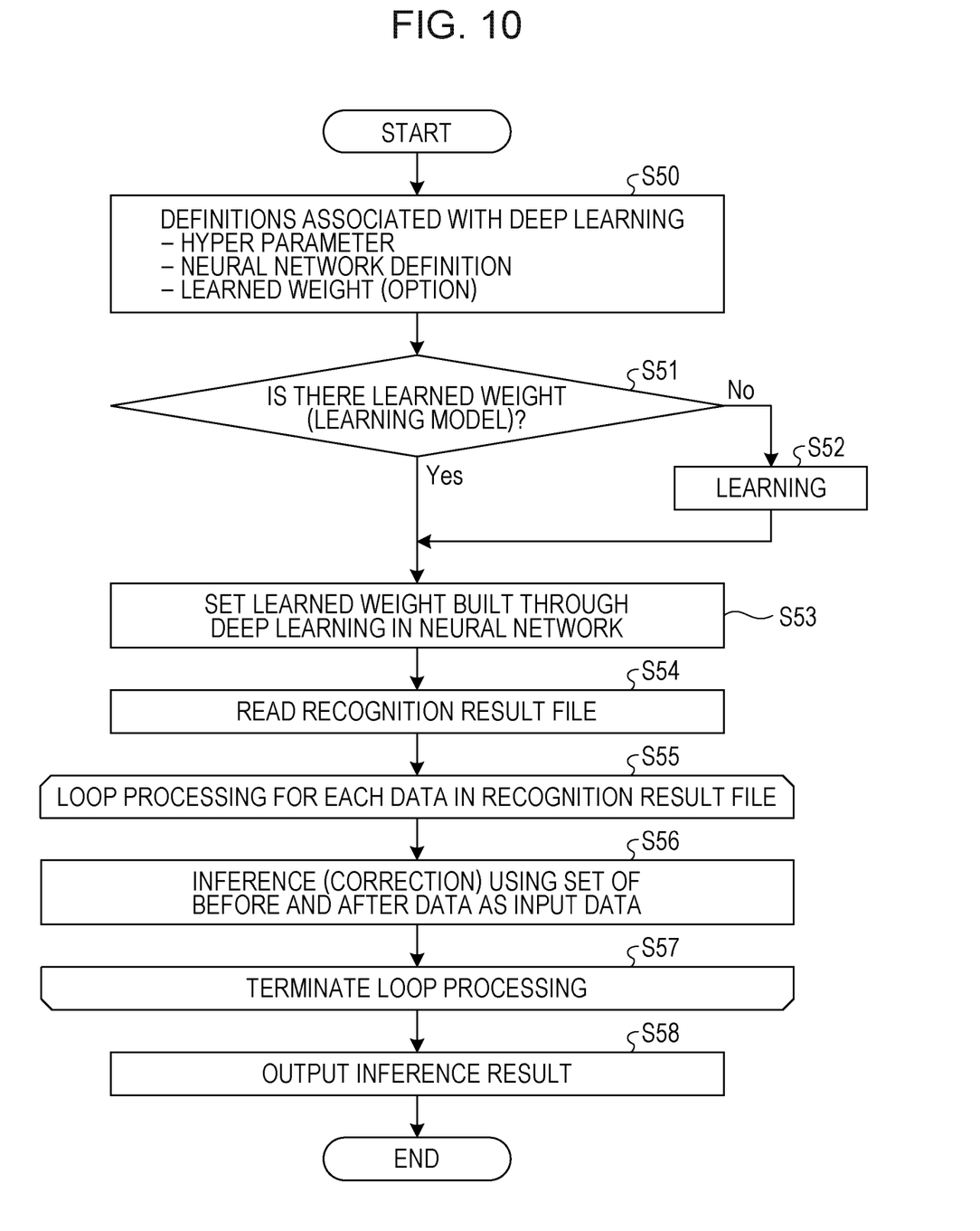
FIG. 10 is a flowchart illustrating a processing example associated with correction.

FIG. 10 is a flowchart illustrating a processing example associated with correction. As illustrated in FIG. 10, and with reference to FIG. 1, once processing is started, the correction unit 34 sets definitions associated with deep learning (hyper parameter 55, neural network definition 53, and learned weight (option) 54) (S50). The correction unit 34 determines whether or not there is learned weight 60 (learning model) (S51). When learning is yet to be performed and there is no learned weight 60 (S51: NO), the correction unit 34 performs learning in the learning phase (S1) described above (S52). When the learning has been performed and there is the learned weight 60 (S51: YES), the read unit 33 advances to S53.

Figure 11:
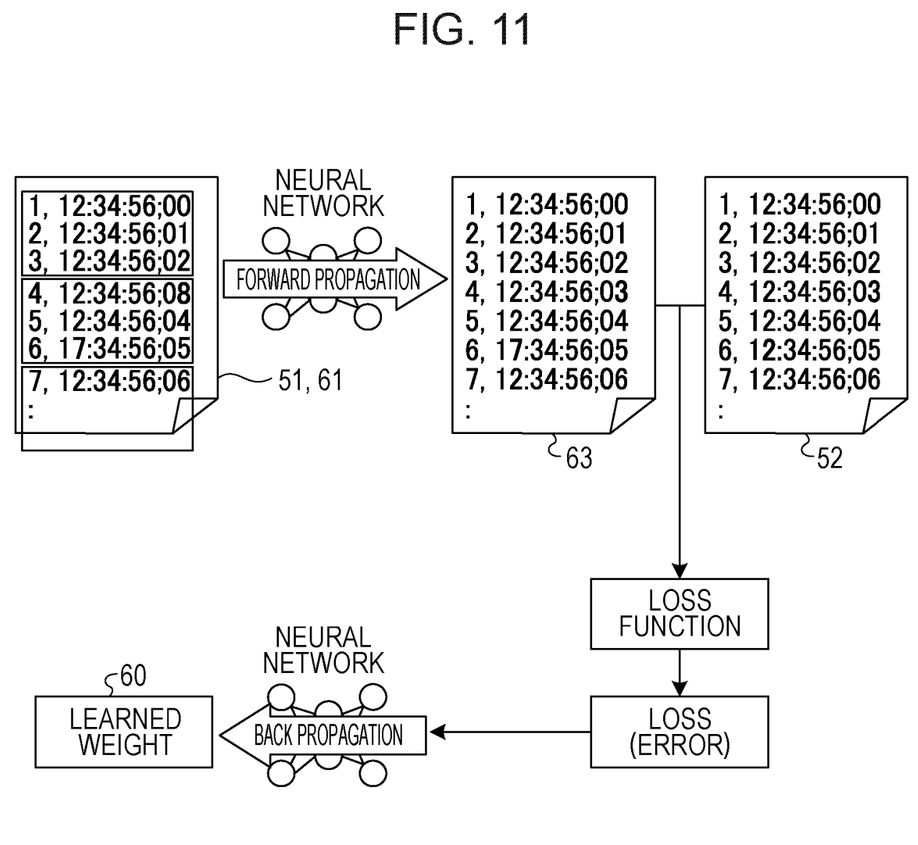
FIG. 11 is an explanatory diagram explaining learning and inference associated with correction.

FIG. 11 is an explanatory diagram explaining learning and inference associated with correction. As illustrated in FIG. 11, in learning associated with correction, teaching data 51 such as count-up or count-down time codes and correct answer data 52 indicating the appearance order (count-up) of correct answers are prepared.

A loss function is used to obtain a loss (error) between the correct answer data 52 and an inference result is obtained by forward propagating the teaching data 51 to the neural network. A learned weight 60 for inferring a result corresponding to the appearance order is obtained by back-propagating the obtained loss to the neural network and thus changing a parameter of each node in the neural network to approximate an optimum solution. In the neural network with the learned weight 60 applied thereto, once character strings in the frames (frame numbers 1 and 3) before and after the target frame (frame number 2) are inputted, for example, the character string corresponding to the appearance order is outputted as the inference result.

Referring back to FIG. 10, after S51 and S52, the correction unit 34 sets in the neural network the learned weight 60 built through the deep learning (S53) to read the recognition result file 43 (S54). The correction unit 34 performs loop processing (S55 to S57) by sequentially reading the respective data (frame number and read character string) from the recognition result file 43.

Once the loop processing is started, the correction unit 34 sets the data of the character strings read from the frames before and after the target frame to be processed, as a set of before and after data. The correction unit 34 infers a character string corresponding to the appearance rule information in the character string by using the set of before and after data as input data (test data 61) of the neural network. The correction unit 34 corrects the read character string such that the appearance order of the character strings read by the read unit 33 conforms to the appearance rule specified in the appearance rule information (S56).

For example, as illustrated in FIG. 11, the correction unit 34 forward propagates character strings ("12:34:56:00" and "12:34:56:02") read from the frame numbers 1 and 3, for example, as the test data 61 to the neural network. Thus, as an inference result 63, the correction unit 34 obtains a character string "12:34:56:01" of the frame number 2 (frame to be processed) corresponding to the appearance rule.

The character string "12:34:56:01" of the frame number 2 in the inference result 63 is the same as "12:34:56:01" that is the read result of the same frame number. Thus, the correction unit 34 leaves the read result of the frame number 2 as it is without correction the read result.

The correction unit 34 also forward propagates character strings ("12:34:56:02" and "12:34:56:04") read from the frame numbers 3 and 5 as the test data 61 to the neural network. Thus, as an inference result 63, the correction unit 34 obtains a character string "12:34:56:03" of the frame number 4 (frame to be processed) corresponding to the appearance rule.

The character string "12:34:56:03" of the frame number 4 in the inference result 63 does not correspond to "12:34:56:08" that is the read result of the same frame number. Thus, the correction unit 34 corrects the read result of the frame number 4 to "12:34:56:03" so as to conform to the appearance rule.

After the above loop processing (S55 to S57), the correction unit 34 outputs the correction result as the correction result file 44 (S58) and then terminates the processing.

As described above, the character recognition apparatus 1 includes the region extraction unit 32, the read unit 33, and the correction unit 34. The region extraction unit 32 extracts a region corresponding to a character string included in each of frames of a moving image to be recognized, for each frame. The read unit 33 reads the character string from the region extracted by the region extraction unit 32. Based on the appearance rule of the character string corresponding to the order of frames, the correction unit 34 corrects the character string read from each frame by the read unit 33 such that the appearance order of the read character string conforms to the frame-order appearance rule specified in the appearance rule information. Thus, the character recognition apparatus 1 may improve the recognition accuracy for characters included in a video, and may accurately recognize characters sequenced in chronological order such as time, time code, or the like displayed in a video, for example.

The correction unit 34 obtains an inference result 63 by inputting the character string read from each frame by the read unit 33 to the learning model obtained by learning the appearance rule information. The correction unit 34 corrects the character string based on comparison between the inference result 63 estimated using the learning model and the character string read from each frame by the read unit 33. Thus, the correction unit 34 may use the learning model using the learned weight 60 obtained by learning the appearance rule information through machine learning such as deep learning, for example, to correct the character string so as to conform to the appearance rule of the character string corresponding to the order of frames specified in the appearance rule information.

The region extraction unit 32 extracts a region in a frame to be extracted, based on a moving average of regions extracted from nearest predetermined number of frames, compared with the frame to be extracted in the region corresponding to the character string. For example, a display region such as a time code and a telop has less position variation between frames. Therefore, the region corresponding to the character string may be accurately extracted by extracting the region corresponding to the character string in the frame to be extracted, based on the moving average of the region extracted from the frames.

All of or some of the various processing functions executed by the character recognition apparatus 1 may be executed on a CPU (or a microcomputer such as an MPU or a micro controller unit (MCU)). Needless to say, all of or some of the various processing functions may be executed on a program analyzed and executed by the CPU (or a microcomputer such as an MPU or an MCU) or on hardware using wired logic. Such various processing functions executed by the character recognition apparatus 1 may also be executed by a plurality of computers in cooperation through cloud computing.

Figure 12:
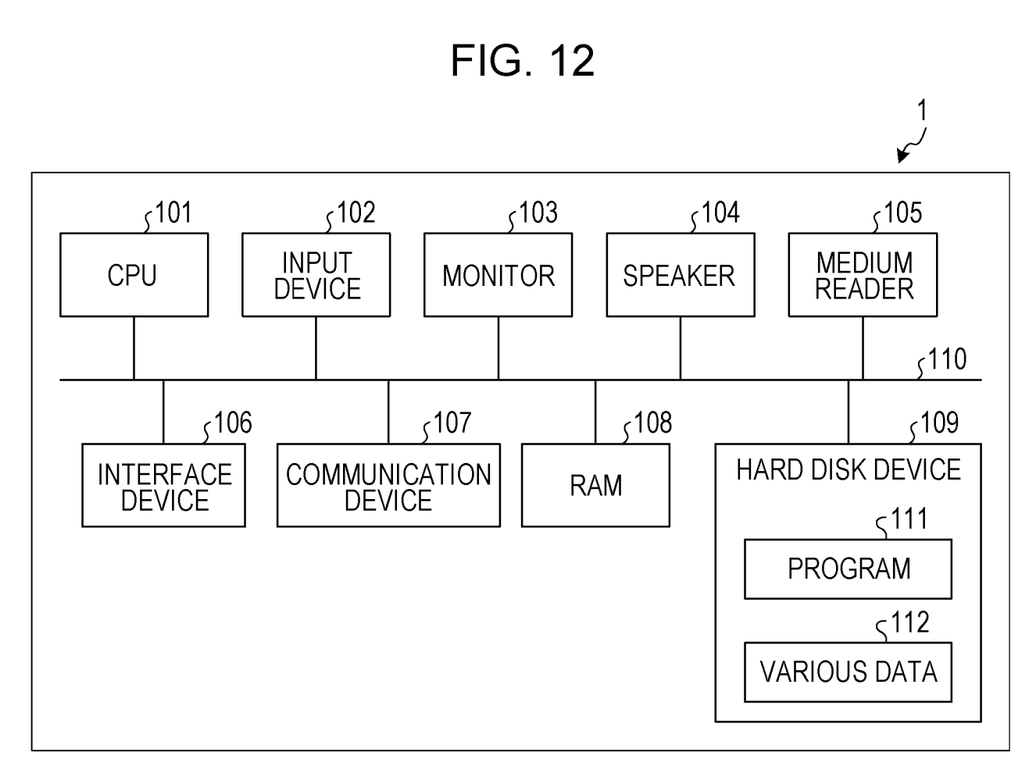
FIG. 12 is a block diagram illustrating an example of a hardware configuration of the character recognition apparatus according to the embodiment.

The various kinds of processing described in the above embodiment may be realized by a computer executing a prepared program. Hereinafter, description is given of an example of a computer (hardware) that executes a program with the same functions as those of the above embodiment. FIG. 12 is a block diagram illustrating an example of a hardware configuration of the character recognition apparatus 1 according to the embodiment.

As illustrated in FIG. 12, the character recognition apparatus 1 includes a CPU 101 that executes various kinds of arithmetic processing, an input device 102 that receives data input, a monitor 103, and a speaker 104. The character recognition apparatus 1 also includes a medium reader 105 that reads programs and the like from a storage medium, an interface device 106 for connecting to various devices, and a communication device 107 for wired or wireless connection with an external device for communication. The character recognition apparatus 1 further includes a random access memory (RAM) 108 that temporarily stores various information and a hard disk device 109 that provides functions as the storage unit 40. The respective units (101 to 109) in the character recognition apparatus 1 are connected to a bus 110.

The hard disk device 109 stores a program 111 for executing various kinds of processing associated with the input unit 10, the control unit 20, and the character recognition unit 30 described in the above embodiment. The hard disk device 109 also stores various data 112 such as the still image group 41, the region result file 42, the recognition result file 43, and the correction result file 44, which are referred to by the program 111. The input device 102 receives input of operation information from an operator of the character recognition apparatus 1, for example. The monitor 103 displays various screens operated by the operator, for example. The interface device 106 has a printer and the like, for example, connected thereto. The communication device 107 is connected to a communication network such as a local area network (LAN) to exchange various information with the external device through the communication network.

The CPU 101 performs the various kinds of processing associated with the input unit 10, the control unit 20, and the character recognition unit 30 by reading the program 111 stored in the hard disk device 109 and developing and executing the program 111 in the RAM 108. The program 111 does not have to be stored in the hard disk device 109. For example, the program 111 stored in a storage medium readable by the character recognition apparatus 1 may be read and executed by the character recognition apparatus 1. Examples of the storage medium readable by the character recognition apparatus 1 include a portable recording medium such as a CD-ROM, a DVD disk, and a Universal Serial Bus (USB) memory, a semiconductor memory such as a flash memory, a hard disk drive, and the like. Alternatively, the program may be stored in a device connected to a public line, the Internet, a LAN, or the like, and may be read from the device and executed by the character recognition apparatus 1.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A character recognition apparatus comprising:
a memory, and
a processor coupled to the memory and configured to:
extract a region corresponding to a character string included in each of frames of a moving image to be recognized;

read a character string from the extracted region of each of the frames;

correct the character string read from each of the frames, based on appearance rule information that specifies an appearance rule of a character string corresponding to an order of the frames, such that an appearance order of the corrected character string conforms to the appearance rule; and correct the character string based on a comparison between the character string read from each frame and an estimation result estimated by inputting the character string read from each frame to a learning model obtained by learning the appearance rule information.

2. The character recognition apparatus according to claim 1, wherein the character string is a time code corresponding to a time in the moving image.

3. The character recognition apparatus according to claim 1, wherein the processor is further configured to extract a region in a frame to be extracted, based on a moving average of regions extracted from a predetermined number of frames nearest to the frame to be extracted.

4. A non-transitory computer-readable storage medium having stored therein a character recognition program for causing a computer to execute a process comprising:

extracting a region corresponding to a character string included in each of frames of a moving image to be recognized;

reading a character string from the extracted region of each of the frames;

correcting the character string read from each of the frames, based on appearance rule information that specifies an appearance rule of a character string corresponding to an order of the frames, such that an appearance order of the corrected character string conforms to the appearance rule; and correcting the character string based on a comparison between the character string read from each frame and an estimation result estimated by inputting the character string read from each frame to a learning model obtained by learning the appearance rule information.

5. The storage medium according to claim 4, wherein the character string is a time code corresponding to a time in the moving image.

6. The storage medium according to claim 4, wherein the extracting includes extracting a region in a frame to be extracted, based on a moving average of regions extracted from a predetermined number of frames nearest to the frame to be extracted.

7. A character recognition method to be performed by a computer, the method comprising:

extracting a region corresponding to a character string included in each of frames of a moving image to be recognized;

reading a character string from the extracted region of each of the frames;

correcting the character string read from each of the frames, based on appearance rule information that specifies an appearance rule of a character string corresponding to an order of the frames, such that an appearance order of the corrected character string conforms to the appearance rule; and correcting the character string based on a comparison between the character string read from each frame and an estimation result estimated by inputting the character string read from each frame to a learning model obtained by learning the appearance rule information.

8. The character recognition method according to claim 7, wherein the character string is a time code corresponding to a time in the moving image.

9. The character recognition method according to claim 7, wherein the extracting includes extracting a region in a frame to be extracted, based on a moving average of regions extracted from a predetermined number of frames nearest to the frame to be extracted.

* * * * *